United States Patent [19]

Frolow

[11] E Patent Number: Re. 33,372

[45] Reissued Date of Patent: Oct. 9, 1990

[54] TENNIS RACKET

[76] Inventor: Jack L. Frolow, 448 Dewey St., Long Branch, N.J. 07740

[21] Appl. No.: 398,263

[22] Filed: Aug. 24, 1989

Related U.S. Patent Documents

Reissue of:

[64] Patent No.: 4,690,405
Issued: Sep. 1, 1987
Appl. No.: 543,431
Filed: Oct. 19, 1983

[51] Int. Cl.[5] ..... A63B 49/04

[52] U.S. Cl. ..... 273/73 C; 273/73 D; 273/73 J; 273/73 H

[58] Field of Search ..... 273/73 C, 73 D, 73 R, 273/73 F, 73 H, 73 E, 73 J, 73 R, 73 L, 75, 67 A, DIG. 7, DIG. 23

[56] References Cited

U.S. PATENT DOCUMENTS

| | | | |
|---|---|---|---|
| 2,215,899 | 9/1940 | Beasley | 273/75 |
| 3,934,875 | 1/1976 | Easton et al. | 273/67 A |
| 3,941,380 | 2/1976 | Lacoste | 273/73 J X |
| 3,993,308 | 11/1976 | Jenks | 273/DIG. 7 |
| 3,999,756 | 12/1976 | Head | 273/73 C |
| 4,119,313 | 10/1978 | Popplewell et al. | 273/73 K |
| 4,138,109 | 2/1979 | Nobbs | 273/73 G |
| 4,165,071 | 8/1979 | Frolow | 273/73 C |
| 4,180,265 | 12/1979 | Staufer | 273/73 D |
| 4,280,699 | 7/1981 | Drake | 273/73 C |
| 4,283,050 | 8/1981 | Nagamoto | 273/73 K |
| 4,330,125 | 5/1982 | Sassler | 273/73 C |
| 4,423,869 | 1/1984 | Haines | 273/73 C |
| 4,429,873 | 2/1984 | Raemdonck | 273/DIG. 23 |
| 4,440,392 | 4/1984 | Popplewell | 273/DIG. 23 |
| 4,488,722 | 12/1984 | Harz | 273/73 D |

FOREIGN PATENT DOCUMENTS

| | | | |
|---|---|---|---|
| 848826 | 8/1970 | Canada | 273/73 F |
| 2721715 | 12/1977 | Fed. Rep. of Germany | 273/73 C |
| 2496471 | 6/1982 | France | 273/73 H |
| 645381 | 9/1962 | Italy | 273/73 H |
| 8112 | of 1884 | United Kingdom | 273/73 H |

OTHER PUBLICATIONS

"Close Encounters with Space Age Fibers", Tennis Magazine, Jun. 1983, pp. 41–43.

*Primary Examiner*—Edward M. Coven
*Assistant Examiner*—William E. Stoll

[57] ABSTRACT

A tennis racket having an unconventional weight and stiffness distribution providing for the same swing weight as rackets of the prior art, a large distance of the center of percussion from the handle end, and a weight means in the grip portion of the racket for reducing the shock and vibration transmitted to the player's arm, when the player impacts the ball with the racket.

57 Claims, 3 Drawing Sheets a
II
III
IV
V
VI
1
2
3
4
5
6
7
8
9
10
11
12
13
14

FIG 15

| RACKET | L | | CP | | GG | W | | WCG | $I_s$ | $I_a$ | | $F_1$ | $D_1$ | N |
|---|---|---|---|---|---|---|---|---|---|---|---|---|---|---|
| PRINC GRAP | 27 | | 18.2 | | 12.45 | 12.85 | | 160.0 | 2910 | 96.8 | | 125 | .007 | 5.63 |
| PRINC PRO | 27 | | 18.1 | | 12.56 | 12.79 | | 160.7 | 2909 | 93.3 | | 120 | .008 | 6.0 |
| HEAD DIR AL | 27 | | 18.0 | | 12.5 | 12.99 | | 162.0 | 2917 | 79.8 | | 137 | .007 | 5.9 |
| DURBAN AL | 27 | | 18.3 | | 13.09 | 12.95 | | 169.0 | 3114 | 78.1 | | 120 | | 6.0 |
| WILSON STING | 27.1 | | 18.4 | | 12.8 | 13.18 | | 168.7 | 3104 | 97.6 | | 121 | .0075 | 6.2 |
| | | | | | | | | | | | | | | |
| 30C | 27.2 | | 19.90 | | 16.75 | 8.60 | | 144.0 | 2866 | 103. | | 168 | .010 | 8.63 |
| 30C+W8 | | | 19.85 | | 14.70 | 9.93 | | 146.0 | 2897 | 105. | | | .010 | |
| 32C | 27.2 | | 19.77 | | 16.90 | 8.78 | | 148.4 | 2956 | 132. | | 160 | .011 | 10.0 |
| 32C+W8 | | | 19.76 | | 14.8 | 10.13 | | 150.1 | 2961 | 132. | | | .011 | |
| 13C | 27 | | 19.23 | | 15.1 | 10.11 | | 152.7 | 2936 | 103 | | 165 | .008 | 7.4 |
| 13C+W8 | | | 19.10 | | 13.6 | 11.44 | | 155.6 | 2936 | 103 | | | .008 | |
| 13C+W14 | | | 19.24 | | 13.28 | 11.59 | | 153.9 | 2961 | 103 | | | .008 | |
| 3XC | 26.63 | | 19.56 | | 15.30 | 9.79 | | 149.9 | 2929 | 69 | | 173 | .008 | 7.5 |
| 3XC+W8 | | | 19.34 | | 13.6 | 11.13 | | 151.4 | 2929 | 69 | | | .008 | |
| | IN | IN | IN | | IN | OZ | | OZ-IN | OZ-IN$^2$ | OZ-IN$^2$ | | $\approx$ SEC | IN | IN |
| 1 | 2 | 3 | 4 | 5 | 6 | 7 | 8 | 9 | 10 | 11 | 12 | 13 | 14 | 15 |

TENNIS RACKET

Matter enclosed in heavy brackets [ ] appears in the original patent but forms no part of this reissue specification; matter printed in italics indicates the additions made by reissue.

BACKGROUND OF THE INVENTION

The present invention relates to game rackets in general, and in particular to a tennis racket having means for reducing the shock, vibration, and muscular strain received by the player, when used by the player in a game.

Prior art rackets having conventional weight and stiffness distribution have considerable shock and vibration transmitted to the player's hand, when the ball impacts the racket at locations other than the center of percussion.

U.S. No. 4,165,071 issued to Frolow Aug. 21, 1979, provided a prior art racket having an unconventional stiffness and weight distribution which provided for a reduction in the shock and vibration received by the player's hand upon impact of the racket with the ball. The racket disclosed by Frolow was easy to move because of its reduced weight, the torque or moment at the player's hand when the racket was held by the player's hand as a cantilever was reduced, the center of percussion was located closer to the point on the racket string netting which was more frequently impacted by the ball in play. This racket had the same hitting power as conventional prior art rackets by maintaining the required moment of inertia or swing weight.

However, when the ball did impact the racket at locations other than the center of percussion, the player's hand absorbed the shock and vibration which did occur.

The present invention utilizes the unconventional weight and stiffness distribution of the racket disclosed by Frolow and also provides a system comprising a weight means and a means for the attachment of the weight means to the handle portion of the racket, for reducing further the shock and vibration received by the player's hand during the impact of the racket with the ball and the vibration subsequent to the impact.

U.S. Pat. No. 3,941,380 issued to Lacost Mar. 2, 1978, provided a weight means attached to the handle end of a racket. The weight and restoring resiliency was designed to vibrate in correspondence to the vibration induced in the racket, when the ball impacted the racket. The weight means absorbed the energy at this single frequency of vibration. The weight means disclosed must be designed differently for each racket having a different structure.

The patent to Lacoste disclosed a racket having a conventional weight distribution and it was very flexible and had considerable vibration at a low frequency induced in it upon impact with a ball. This racket had the weight of conventional prior art rackets, and the additional weight means added by Lacoste results in a heavy racket.

The present invention provides a weight means fastened to the handle portion of the racket and the movement between the weight means and the handle portion does not vibrate at the frequency corresponding to the frequency of vibration of the movement between the racket frame and the hand of the player, induced in the racket when the racket impacts the ball. In column 4, lines 22 to 26 Lacoste indicates that if the frequency of the amortizing system is less than 45 Herz one finds the difference between the frequency of the amortizing system itself and the frequency of the frame is too great to permit the amoritization to be significant. Since the frequency of the frame $f_1$ was 100 Herz, this difference between the frequencies is 55 Herz, and thus a frequency of the amortizing system itself outside the range of $f_1 \pm 0.55\ f_1$, will not permit the damping to be significant. This range cooresponds to frequencies less than $0.45\ f_1$ and greater than $1.55 f_1$. The present invention provides a weight means which absorbs the energy of the shock and vibration at all the frequencies of vibration that occur.

Also the present invention provides for a racket having a light weight, a center of percussion close to the center of the racket face, a low torque at the player's hand, when the racket is held as a cantilever by the player, the same hitting power as prior art rackets, and a reduction over the prior art in the shock and vibration transmitted to the player's hand upon the racket impacting the ball.

U.S. Pat. No. 4,364,564 issued to Lewis Dec. 21, 1982, discloses a device which is worn on a player's wrist to absorb the shock experienced by a player in a game of tennis or the like. This device does not interact directly with the racket which generates the shock and vibration to the player's hand upon impact of the ball.

The present invention absorbs the energy before it gets to the player's hand and also reduces the shock and vibration generated by the racket upon impact with the ball.

U.S. Pat. No. 4,153,249 issued to Plangenhoef May 8, 1979, discloses slight mechanical modification to a conventional prior art racket to make the racket more compatible with the mechanics of the human arm, more comfortable to use and reduce the strain on the arm of the player. This patent discloses a conventional prior art racket with a weight attached to the handle end and a side weight attached to one side of the head portion of the racket. The patent discloses that the magnitude of the weights are adjusted to coact and provide for the center of percussion taken about a center of rotation which is located at 4¾ inches from the handle end, to be located between 22/27 and 23/27 of the racket length from the handle end of the racket, and the center of gravity to be located at a distance slightly less than half the length of the racket.

The use of the side weight on one side of the racket head increases the weight of the racket given by W, increases the distance of the center of gravity to the handle end given by Cg, and increases the moment of inertia of the racket about the handle end. These increases result in the torque or moment at the handle end held in the hand of the player as a cantilever given by the product WCg to be very high, as well as make the racket difficult to swing and maneuver. Conventional prior art rackets and the racket disclosed by Plagenhoef have a high torque at the end of the racket handle held in the hand of the player and the addition of this side weight makes this torque more unfavorable. The racket disclosed by plagenhoef has a weight W of 430 to 440 grams of 15.136 oz to 15.488 oz and the distance of the center of gravity Cg to be from 12 to 13 inches, thereby resulting in a torque given by WCg to be 182 to 197 oz-inches at the player's hand. These values are exceptionally high.

The increase in weight to the conventional prior art rackets, makes the racket difficult to maneuver. The racket disclosed by Plagenhoef has a weight of 15.136 oz to 15.488 oz which is very high.

The present invention provides for a racket having a torque given by the product WCg, and a weight W which is much less than the racket disclosed by Plagenhoef, and further provides for means which effectively reduces the shock and vibration to the hand and body of the player.

U.S. Pat. No. 3,999,756 issued to Head Dec. 28, 1976, discloses a racket having a strung area having a length along the longitudinal axis of the racket to be between 12 and 15 inches, and the width of the strung area to be between 9½ and 11½ inches in a direction perpendicular to the longitudinal axis of the racket.

The center of percussion of a racket similar to that of the racket disclosed, the Prince GRAPHITE, taken about the handle end measured to be 18.1 inches from the handle end.

The present invention provides for a racket having a strung area having a width being greater than 12 inches, which is as large as the racket disclosed by Head, but provides for a center of percussion which is greater than 18.1 inches, and provides for a weight much less than 12 ounces, thereby making the racket much easier to maneuver, and providing for much less shock and vibration being transmitted to the player, when the racket impacts the ball.

SUMMARY OF THE INVENTION

U.S. Pat. No. 4,165,071 issued to Frolow Aug. 21, 1979, reduce the shock and vibration by providing that the center of percussion be located closer to the center of the racket face, where the ball impacts the racket more frequently. As stated in col. 3, lines 61–63, the reaction at the handle end of the racket is zero when the ball impacts the center of percussion. If the center of percussion is 19.5 inches from the handle end and the ball strikes the racket at head of the racket at 26.5 inches from the handle end the reaction is $$R = \frac{26.5 - 19.5}{19.5} P,$$ where $P$ is the impulsive force on the racket caused by the ball.

$$R = 0.358P$$ $R$ is the impulsive Reactive force at the racket handle end.

If the center of percussion were 18.0 inches, the reactive force R would be $$R = \frac{26.5 - 18}{18} P$$

$$R = .472\ P$$

Thus there is a significant reduction in the shock experienced by the player when relatively small changes are made in the distance of the center of percussion from the handle end.

The addition of weight to the handle end held by the hand of the player of the racket does not affect the torque or moment at the racket handle end, when the player holds the racket as a cantilever. The torque or moment being given by the product WCg where W is the weight of the racket, and Cgis the distance of the center of the center of gravity from the handle end. Since the weight is added at the pivot located at the handle end, it simply increases the weight W of the racket to the same degree that it reduces the distance Cg so that the product WCg remains the same.

The improvement discovered relates to the fact that a weight added to the handle end does something else in addition to the changes discussed above.

If a reactive force R is experienced at the handle end, this force would tend to make the handle end accelerate or move. This instant acceleration would be given by $$R = MA,$$

where M is the effective mass accellerated by the movement of the handle end, and A is the accelleration of the handle end.

Normally a player's hand is attached to the handle end and it would absorb all of the reactive shock R. However, if a weight is attached to the handle end, this reactive shock is shared by the attached weight and the player's hand. Further, if the weight added is composed of energy absorbing material that is loosely attached to the handle end, it will absorb much of the shock and vibration. Other energy devices may be used. A tube may be filled with a liquid and a weight, a liquid alone, sand, lead pellets, etc. A strip of energy absorbing material may be attached to the handle end loosely, so that it will impact the racket handle wall when the ball impacts the racket.

Further, rackets having a weight and stiffness distribution as disclosed by the patent to Frolow, have nodal pivots in the handle end located much further away from the handle end than conventional prior art rackets. A racket having a node located at a large distance from the handle end allows the hand holding the handle end, and the weight means attached to the handle end by this invention, to move easily balance the vibratory forces acting on the other side of the node. That is, the node acts as a fulcrum in a see-saw, the further away the forces at the handle end from the fulcrum, namely the shock and vibratory forces generated by the impact of the ball upon the racket.

Further, the patent to Frolow discloses on col. 10, lines 33–34, that when a racket is struck, the racket will vibrate at a frequency. The lower the frequency is the larger the amplitude of vibration will be. Rackets utilizing the stiffness and weight distribution disclosed by the patent to Frolow have a higher frequency of vibration and a smaller amplitude of vibration.

The present invention utilizes rackets having the stiffness and weight distribution disclosed by Frolow, thereby making the weight means added to the racket handle much more effective in reducing the shock and vibration transmitted to the player's hand. For example claims of this application utilize claim 23 of the patent to Frolow. Claim 23 requires, "said netting having a length along the longitudinal axis of said frame greater than 9 inches and a width along an axis perpendicular to said axis greater than 7.5 inches;". This claim further requires that the distance Cp be greater than 18.75 inches and the weight W be less than 10.7 ounces with appropriate language. Claims of this application make use of the requirement stated in the quotation above.

Further prior art rackets having large strung areas, such as the Prince Graphite racket, have a large moment of inertia about the longitudinal axis of the racket. This increase in inertia has provided for less torque to the player's hand when the ball impacts the racket at distance from the longitudinal axis of the racket. The large strung area requires a large perimeter for the strung area and hence the weight would be larger than rackets having smaller strung areas. However, by utilizing composite materials and higher strength alloys the prior art has maintained the weight of the head.

The weight distribution required by the large strung area also has reduced the distance of the center of percussion taken about the handle end of the raacket from the handle end.

The present invention by making structural improvements over prior art rackets has provided a racket having an unconventional weight and stiffness distribution as disclosed by Frolow, thereby allowing for a racket having a large strung area being lighter than prior art rackets and having less shock and vibration transmitted to the player's hand upon impact of the ball on the racket. The reduction in the shock and vibration transmitted is further reduced in the present invention by the use of a weight means added to the handle portion of the racket.

It is an object of this invention to provide a racket having a weight means for reducing the shock and vibration which is transmitted to the player's hand.

It is also an object of this invention to reduce the shock and vibration transmitted to the player's hand when the ball impacts the racket, by means of structural improvements in prior art rackets which provide for the center of percussion being located closer to the center of the racket face, and which provide for the reduction in the weight of the racket over prior art rackets.

BRIEF DESCRIPTION OF THE DRAWINGS

FIG. 15 is a chart tabulating measurements on prior art rackets, and on rackets made in accordance with the invention.

DETAILED DESCRIPTION OF PREFERRED EMBODIMENTS

Figures 1, 2, 3, 4, 5, 6, 7, 8:
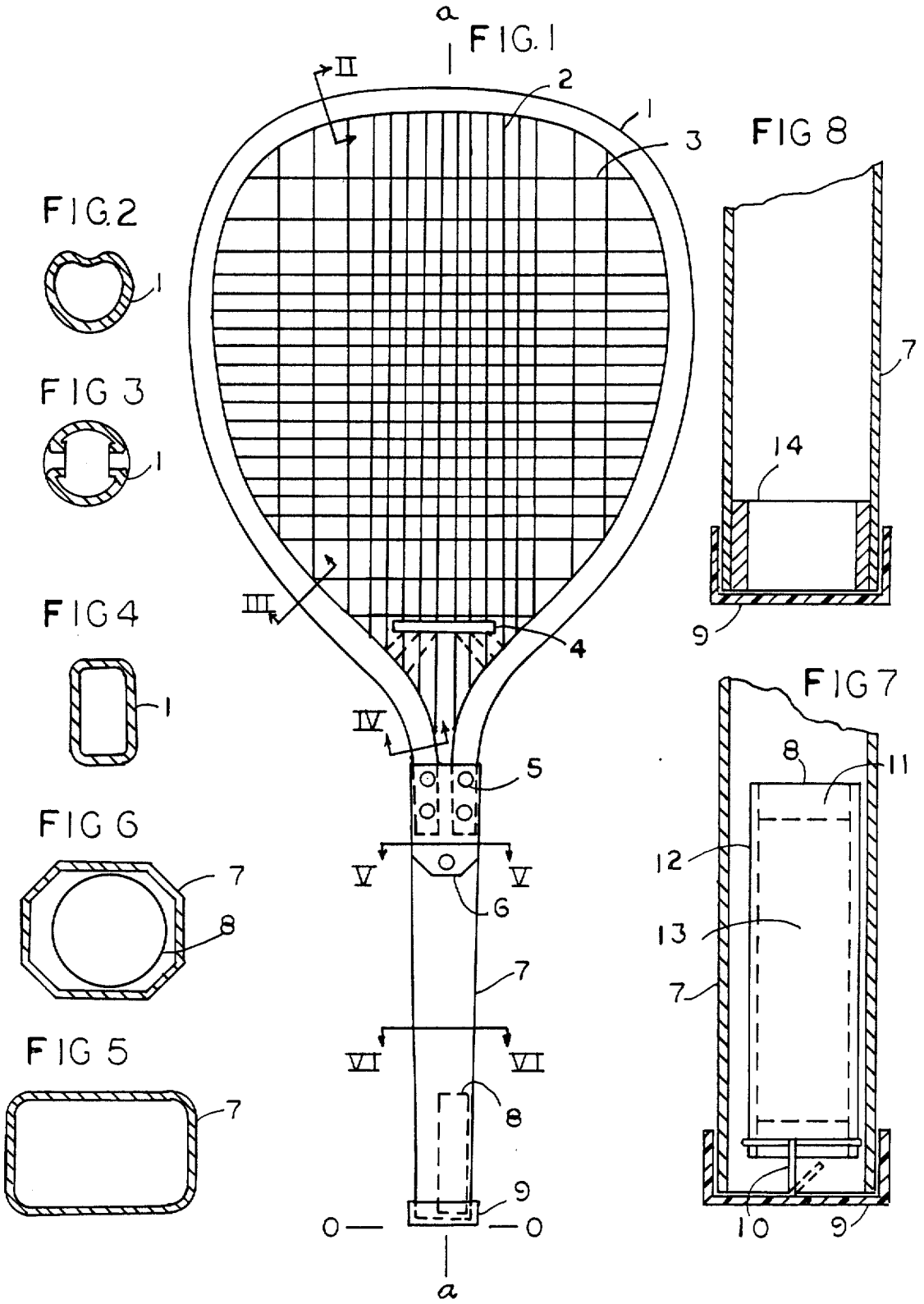
FIG. 1 is a front view of a racket according to the invention.
FIG. 2 is a crossectional view of section II—II.
FIG. 3 is a crossectional view of section III-III.
FIG. 4 is a crossectional view of section IV-IV.
FIG. 5 is a crossectional view of section V—V.
FIG. 6 is a crossectional view of section VI—VI.
FIG. 7 is an enlarged cut-away view of the handle end 7 containing the weight means 8.
FIG. 8 is an enlarged cut-away view of the handle end 7 containing an alternate weigh means 14.

FIG. 1 depicts a front view of a racket. The longitudinal axis of the racket is shown as axis a—a in FIG. 1 running from the center of the head portion end of the racket to the center of the grip portion end of the racket. A transverse axis at the handle end of the racket is shown as axis o—o in FIG. 1. The frame 1 is shaped and formed from a hollow tube of 6061-T6 aluminum having a wall thickness of 0.035 inches and an outside diameter of 0.75 inches and a perimeter of 2,356 inches. The shape of the head portion of the racket formed by the tube 1 comprising a crown portion and two adjacent side portions, is an inverted tear drop shape having more material toward the head end. The top crown portion is flatter than conventional rackets. FIG. 2 depicts a cross-section which shows a groove, which serves to protect the strings 2. FIG. 3 shows a crossection at the head portion wherein the holes for the strings are shown. Nylon grommets not shown can be used in these holes. FIG. 4 shows a cross-section of the tube 1 which has been shaped into a flat oval. The ends of tube 1 are inserted into the open end of the handle member 7 and are fastened to the handle 7 with blind rivets 5 through the gusset plate 6, which is a sheet of 7075-T6 aluminum 0.020 inches thick. FIG. 5 shows a cross-section view of the handle 7 which has been shaped into a rectangular form, from the hexagonal crossectional shape shown in FIG. 6 of handle 7. The handle 7 is shaped from a rectangular sheet of 7076-T6 aluminum which is 0.020 inches thick, having the overlapping edges fastened together with blind rivets 5, which are not shown. The end of the handle is covered with a plastic butt 9. A portion of handle is covered with a suitable, thin, light grip, which is not shown. The grip portion of the handle comprises the said portion of the handle member 7 covered by said light weight grip material and the butt 9. The grip portion end is located at the handle end of the racket. The location of the axis o—o as shown in FIG. 1 is also at the handle end of the racket. Inserted within the hollow handle 7, is a weight means 8. FIG. 7 depicts the weight means 8, which consists of a rubber tube 12 having the ends plugged with rubber discs 11. The interior 13 of the tube 12 can be partially filled with a liquid, sand, metal pellets or a combination of these. It can also be filled with strips of energy absorbing material. Alternatively the tube 12 need not be filled, but consist of a strip of suitable energy absorbing material. The weight means 8 is attached to the handle end by the wire 10, which allows free movement of 8 within the hollow handle 7, so that 8 may strike against the side wall of the handle 7, upon impact of the ball against the racket. FIG. 8 shows an alternative weight means 14, which is a lead or other suitable metal. The metal 14 is shown fastened firmly against the racket handle wall, but it can also be attached loosely so that it may strike the handle side wall upon impact of the ball with the racket. When the weight means 14 is firmly fastened against the racket handle wall, responsive to a single impulse force to the weight means 14, there is no significant motion between the weight means 14 and the racket handle. When the weight means 8 is loosely attached to the handle, responsive to a single impulsive force to the weight means 8, the motion between the weight means 8 and the handle portion does not oscillate between two extreme positions from the said handle portion a plurality of cycles. The weight means 8 and the weight means 14 both reduce the shock and vibration received by the player. The weight means 8 shown in FIG. 7 is an approximately three inches long and weighed 1.1 ounces. A much shorter weight means can be used. The increase in the cantilever moment WCg, that the weight means 8 adds is given by $(1.1)(1.5)=1.65$ ounce inches. The increase to the moment of inertia of the racket about the handle end is given by $(1.1)(3.0/3)^2=3.3$ ounce-inches.

Since the moment of inertia of the racket labeled 13C is 2936 oz-in$^2$, this increase is negligible. The cantilever moment for this racket 13C is 152.68 oz-inches, so that the increase is 152.68+1.65=154.33 oz-in. The changed center of percussion distance Cp would be 2939.3/154.33=19.043 inches.

The center of percussion without the weight means 8 was 19.23 inches=2936/152.68

Thus the change was 0.182 inches.

A weight means 8 much shorter than 3 inches can be used so that this change can be made smaller. From this discussion in can be seen that if the weight means is moved away from the handle end of the racket toward the head end, it becomes less effective in absorbing the shock and vibration, it affects the cantilever moment WCg, and also the distance of the center of percussion Cp.

Measurements were made on an embodiment similar to that shown in FIG. 7. With the weight means and also without the weight means. The results tubulated in the chart shown in FIG. 15.

Figure 9:
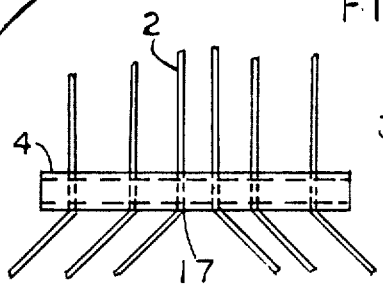
FIG. 9 is an enlarged front view of the string member 4.
Figure 10:
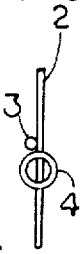
FIG. 10 is a side view of the string member 4.

Shown in FIG. 9 is a string member 4 which guides the central vertical strings 2 away from the longitudinal axis of the racket to terminate in the head member 1 at a greater distance from the junction of the handle member 7 and the head member 1 than they would, if they continued in a straight line. As shown in FIGS. 1 and 4, the angle formed by the two portions of the vertical strings are approximately 45°, and this angle can be varied. This may be advantageous in providing more flexibility in choosing the spacing between the vertical strings. However, string member 4 need not be used, and the vertical strings would then continue as shown in FIG. 1 by the solid lines, and not be diverted as shown by the dotted lines. FIGS. 9 and 10 show an enlarged view of the string member 4. The string member shown is a hollow nylon tube which is supported by the vertical strings 2, and the string member 4 provides guide holes 17 for the strings 2 to pass through. These holes 17 maintain the spacing between the strings 2. The direction of the forces exerted by the tension in these strings on the string member 4, pushes the member 4 toward the head of the racket against the lowest horizontal string 3. The central vertical strings keep member 4 centrally located on the longitudinal axis. The string member 4 is very light, is free to move with any movement of the strings, and provides the proper spacing for the central vertical strings. Many variations in the structure of the string member 4 may be made to accomplish the objectives as outlined herein.

The spacing between the vertical strings which are adjacent is closer for those strings which are located closer to the longitudinal axis of the racket, than the spacing for those strings which are further away from the longitudinal axis.

The spacing between the adjacent horizontal strings are also closer together for those strings which are located closer to the central horizontal axis of the racket face than for those strings which are located further away. This variable spacing provides for a concentration of strings at the center of the racket face and minimizes the trampoline effect which is common to rackets which have a oversize or large strung area.

Figure 11:
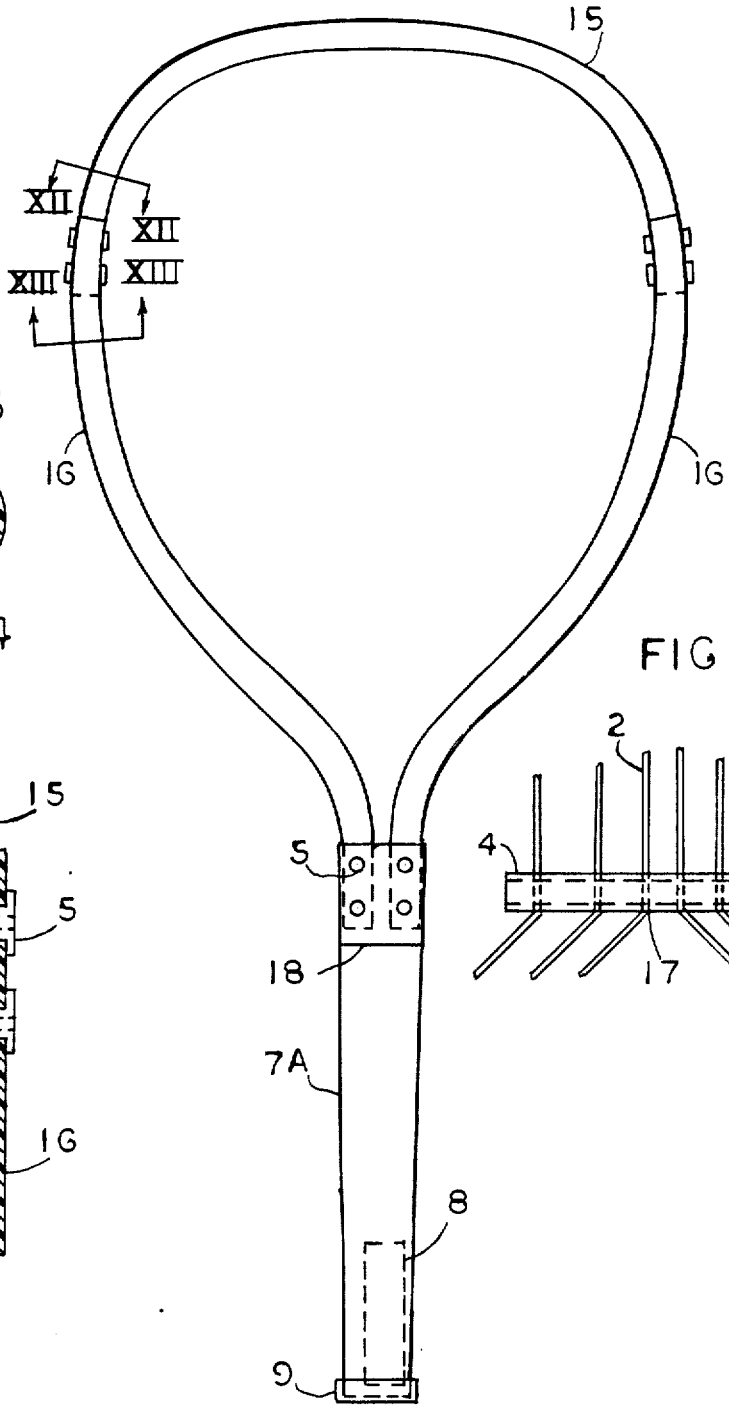
FIG. 11 is a front view of a racket according to the invention having a graphite composite handle 7A, and graphite composite head side members 16. The top crown portion of the head being aluminum.
Figure 12:
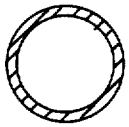
FIG. 12 is a crossectional view of section XII-XII of 15.
Figure 13:
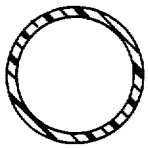
FIG. 13 is a crossectional view of section XIII-XIII of 16.

FIG. 11 depicts another embodiment of this invention. The crown portion of the head portion of the racket 15 has the same contour and crossectional shape as the crown portion of the head portion of the racket shown in FIG. 1. It is also made from 6061-T6 aluminum. However, it is not as long as the tube 1, and it joins member 16 as shown in FIG. 11. The crown portion of the racket does not have its weight reduced over prior art rackets, since sufficient weight is required to obtain the desired swing weight, and weight located in the crown portion moves the center of percussion toward the crown portion of the racket. Thus the use of a composite material of fibers and resin having great strength and light weight being a major portion of the crown portion and resisting a major portion of the mechanical forces which are resisted by the crown portion, these forces resulting from the tension of the strings in the string netting, is not employed. It is more advantageous to employ less costly materials in the crown portion which are more easily used in the fabrication of the crown portion such as metal, wood and other materials. Member 16 is a graphite composite tube having a diameter which mates with the diameter of the member 15. Although FIG. 11 shows the head portion of the racket without strings on string holes, it is understood that the head portion utilizes these materials, and other materials which may be used in the manufacture of the racket. The stretched strings exert mechanical forces on the head portion of the racket which are resisted by the crown portion and the side portions of the head portion. Member 16 comprises substantially only one material and this material resists substantially all of the forces which are resisted by the side portions of the racket. This said material of member 16 is a composite of fibers and resin. FIG. 12 and FIG. 13 show the tubular shape of members 15 and 16. Members 16 terminate with the handle member 7A, and their ends are fastened to 7A by means of blind rivets and a gusset plate 18. The use of a graphite composite member 16, reduces the weight of the racket in the middle portion of the racket and thereby moves the center of percussion toward the head of the racket, reduces the cantilever moment given by the product WCg, and also reduces the weight of the racket. Each of the side portions 16 comprise substantially only one material and this material resists substantially all of the mechanical forces which are resisted by the side portions, these forces resulting from the stretched strings in the string netting. This said material is a composite of fibers and resin which has great strength per unit weight and also great stiffness per unit weight which permits the reduction of weight in the side portions and yet provides adequate strength and stiffness. Other materials may be employed in the side portions for other purposes. Member 7A, the handle is also a composite graphite material. The handle 7A has the same shape and cross-sectional shape as the handle member 7 shown in FIG. 1. The thickness of the wall of 7A is approximately the same as 7 with the end portion in which the rivets 5 are used being thicker. However, it is much lighter, stiffer, and stronger than 7. Another embodiment of the invention is accomplished, when handle 7A is used in lieu of handle 7 in the racket shown in FIG. 1.

Figure 14:
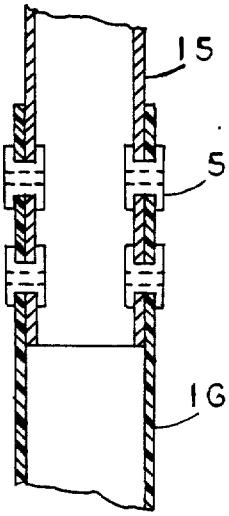
FIG. 14 is an enlarged crossectional view of the junction of the head portions 15 and 16.

FIG. 14 depicts a method of joining member 16 to member 15. Hollow blind rivets 5 are used as shown and permit the strings to pass through them to form the racket netting. Member 15 may comprise wood as in prior art rackets, having the shape as shown in FIG. 11. The end portions of members 15 and 16 can be tapered to allow the racket string tension to further lock them together.

Measurements were taken on rackets similar to the embodiment shown in FIG. 11 and to the embodiment shown in FIG. 1 wherein the handle member 7A is used in lieu of 7. The results of these measurements are tabulated in the chart shown in FIG. 15.

Tests and measurements were made on prior art rackets, and rackets conforming to the requirements of this invention to show the marked differences between them. The results are tabulated in the chart shown in FIG. 15.

The various rackets tested are listed under col. 1 on the rows of the chart as follows:

PRIOR ART RACKETS

Row 1. Prince Graphite

Row 2. Prince Professional an aluminum racket

Row 3. Heat Tournament Director an aluminum racket

Row 4. Durban, an aluminum racket

Row 5. Wilson Sting, a graphite racket

RACKETS IN ACCORDANCE TO THE INVENTION

Measurements were taken on the rackets without the weight means 8 shown in FIG. 1 first, then measurements were taken on the same rackets with the weight means 8.

Row 7. #30C is a racket similar to the embodiment shown in FIG. 1, utilizing the graphite handle 7 A shown in FIG. 11, in lieu of the aluminum handle 7, without the weight means 8, being employed.

Row 8. #30 with the weight means 8 being employed.

Row 9. #32 is a racket similar to the embodiment shown in FIG. 11 but without the weight means 8 being employed.

Row 10. #32 with the weight means 8 being employed.

Row 11. #13C is a racket similar to the embodiment shown in FIG. 1, having the aluminum handle 7, but without the weight means 8 being employed.

Row 12. #13C with the weight means 8 being employed.

Row 13. #13C with weight means 14 being employed.

The weight means 8 shown in FIG. 7 employed in the rackets listed in rows 9, 11, and 13 was three inches long, weighed 1.1 ounces and space 13 was partially filled with sand.

The weight means 14 shown in FIG. 8 employed in the racket listed in Row 14 was 1.48 ounces, 1 inch wide and lead.

Other rackets than those listed in the chart of FIG. 15, conforming to the requirements of this invention have been fabricated. For example a racket similar to the embodiment shown in FIG. 1 having a contour and crossectional shapes as disclosed in FIG. 1, was fabricated of composite graphite, that is, the head member 1 and the handle member 7 utilized composite graphite. Also rackets similar to the racket disclosed in FIG. 1, but having a smaller width for the string netting were made, such as #3XC which is listed in rows 14 and 15 of FIG. 15. Further, weight means 8 and 14 having weights greater and less than used with the rackets listed in the chart of FIG. 15 were employed. For example if a weight means such as 14 or 8 having a short length as previously indicated and having a weight of 3.0 ounces were employed with racket #32C the increase in WCg would be $3.0 \times 0.5 = 1.5$ ounce-inch. The new WCg would then be $148.4 + 1.5 = 149.9$ oz-inches, which is practically unchanged. The new weight W would be $8.78 + 3.0 = 11.78$ ounces. The increase in the moment of inertia $I_s$ would be $3.0(1)^2/3 = 1$ ounce-inches. The new $I_s$ would be $2956 + 1 = 2957$ ounce-inches$^2$, which is practically unchanged. The new Cp would be $2957/149.9 = 19.73$, which is practically unchanged. Thus it is possible to adjust the weight of a racket to be as heavy as is desired without affecting the center of percussion Cp, the swing weight or moment of inertia $I_s$, or the moment WCg of the racket significantly. The heavier the weight means 8 or 14 used, the more the shock and vibration received by the player's hand will be reduced. All the rackets with these variations performed well.

The rackets listed in rows 7 through 15 were hand made. With the use of proper tools and facilities for heat treatment, forming, punching, and moulding of composite materials improvements in the performance of these rackets should be obtained.

The tests and test methods employed on the rackets listed in the chart of FIG. 15, are the same as those used and described in col. 15 of the U.S. Pat. No. 4,165,071 to Frolow and are as follows:

Col. 1 Designates the racket tested.

Col. 2 L, the length of the racket in inches.

Col. 4 Cp, the distance of the center of percussion from the handle end of the racket. The racket is supported at a pivot at the handle end. The racket is caused to swing as a pendulum having a small amplitude for more than 10 consecutive swings. The time T in seconds is measured for the pendulum to compete 10 swings. The center of percussion distance Cp in inches is given by the formula $Cp = 9.79T$ Col. 6 Cg, the distance of the center of gravity from the handle end of the racket in inches.

Col. 7 W, the weight of the racket in ounces.

Col. 7 WCg, The product of Col. 6 and Col. 7.

Col. 10 Is, The moment of inertia about the axis 0—0, in ounce-inches$^2$.

Col. 11 Ia, the moment of inertia about the longitudinal axis a—a in ounce-inches$^2$.

Col. 13 fl, the frequency in cycles per second of the vibration perpendicular to the racket face with the ends free, and the racket is held at the nodal pivot near the handle end of the racket. This mode of vibration has a node near the handle end of the racket and a node in each side of the head portion of the frame near the head end of the racket.

Col. 14 Dl, the deflection perpendicular to the racket face, in inches, of the middle of the racket between the ends when a weight of 80 ounces is applied to the middle of the racket, and the racket is supported six inches from the handle end of the racket, and the head frame sides are supported at points opposite the center of the face.

Col. 15 The distance in inches of the node closest to the handle end, from the handle end of the racket associated with the frequency fl. The racket is held between the forefinger and thumb in the vicinity of the node located in one side of the head portion of the frame. The racket is tapped repeatedly with a rubber tipped hammer along the longitudinal axis of the racket in a direction perpendicular to the face of the racket, in the vicinity of the node located near the handle end. The location at which the minimum amplitude of vibration occurs when tapped having the frequency fl, is the precise location of the node.

It is understood that variations and modifications may be made in the embodiments of the invention within the spirit of the present invention and the scope of the appended claims.

I claim:

1. A complete tennis racket held by the hand of a player to impact a ball comprising at least a frame including a head portion supporting a string netting in a plane and a handle portion having a grip portion suitably adapted for the hand to grip, the end of the grip portion being located at the handle portion end of the racket, said racket having a longitudinal axis running from the center of the head portion end of the racket to the center of the grip portion end of the racket; said racket having a weight and stiffness distribution providing for a frequency of vibration $f_1$, in cycles per second when tested in accordance with test 13 of FIG. 15 herein before defined; said racket having a weight distribution providing for a center of percussion located at a distance Cp in inches from the end of the grip portion when tested in accordance with test 4 of FIG. 15 herein before defined, said center of percussion taken about a pivot located at the end of the grip portion, said pivot having an axis perpendicular to the longitudinal axis of said frame and parallel to the plane of said string netting; said racket characterized in that said handle portion has a system comprising a weight means and a means for the attachment of said weight means to the handle portion of the racket for reducing the shock and vibration received by the player's hand during the impact of the racket with the ball and the vibration subsequent to said impact; said system having a center of gravity being located at all times at a distance F from the end of the grip portion, said distance F being less than 0.26 of the overall length of said racket along said longitudinal axis; said weight means being firmly attached to said handle portion to provide that responsive to a single impulsive force to said weight means there is no significant movement between said weight means and said handle portion; and said racket excluding said system has said distance Cp greater than 18.75 inches; and said racket excluding said system has said frequency of vibration $f_1$ greater than 140 cycles per second; said racket having a weight distribution provided for a moment of inertia Ia in ounce-inches squared about said longitudinal axis and the magnitude of Ia is greater than 75 ounce-inches squared, and the said magnitude of Ia being attained without a weight means being attached to the said head portion of the racket.

2. A tennis racket as in claim 1 wherein said handle portion resists mechanical forces, said forces resulting from said impact of the racket with the ball, said handle portion comprises a thin wall tube substantially only one material and said material resisting substantially all of said mechanical forces resisted by said handle portion, said one material being a composite of fibers and resin.

3. A racket as in claim 1 wherein aid racket including said system has a weight W in ounces; and said racket including said system has a center of gravity located at a distance Cg in inches from said end of the grip portion; said racket characterized in that the product of said distance Cg and said weight W given by the formula WCg is less than 160 ounce inches.

4. A complete tennis racket held by the hand of a player to impact a ball comprising at least a frame having a head portion supporting a string netting in a plane and a handle portion being a hollow tube said tube having a side wall said handle portion having a grip portion suitably adapted for the hand to grip, the end of the grip portion being located at the handle portion end of the racket; said racket having a longitudinal axis running from the center of said head portion end of the racket to the center of said grip portion end of the racket; said netting having a length along the longitudinal axis of said frame greater than 9 inches and a width along an axis perpendicular to said axis greater than 7.5 inches; said racket having a weight distribution providing a center of percussion located at a distance Cp in inches from the end of the grip portion when tested in accordance with test 4 of FIG. 15 herein before defined, said center of percussion taken about a pivot located at the end of the grip portion, said pivot having an axis perpendicular to the longitudinal axis of said racket and parallel to the plane of said string netting; said racket having a weight and stiffness distribution providing a frequency of vibration $f_1$ in cycles per second when tested in accordance with test 13 of FIG. 15 herein before defined, said racket characterized in that said handle portion has a system comprising a weight means and a means for the attachment of said weight means to the handle portion of the racket for reducing the shock and vibration received by the player's hand during the said impact of the racket with the ball and the vibration subsequent to said impact; said system having a center of gravity being located at all times between the end of the grip portion and points located on the handle portion at a distance F from the end of the grip portion, said distance F being equal to 0.26 of the overall length of said racket along said longitudinal axis; said weight means being loosely attached to said handle portion; substantial space being provided between said weight means and said side wall of said handle portion, said space allowing said weight means to attain significant velocity with respect to said handle portion in the direction perpendicular to said longitudinal axis upon impact of said racket with said ball, the plane of said netting being substantially parallel to the direction of the force of gravity upon impact of said racket with said ball; said weight means being capable of absorbing energy from the racket handle portion said energy being induced in said handle portion when the racket impacts the ball; said weight means and said means for the attachment of said weight means to the handle portion of the racket being configured and structured to provide that responsive to a single impulsive force to said weight means the movement between said weight means and said handle portion is not vibratory at a frequency $f_2$, said frequency $f_2$ being greater than 0.45 of said frequency $f_1$ and being less than 1.55 of said frequency $f_1$; and said racket including said system having a weight W in ounces, and said racket including said system having a center of gravity located at a distance Cg in inches from the end of said grip portion; said racket having the product of said weight W and said distance Cg given by the formula WCg being less than 160 ounce-inches and said racket including said system having said distance Cp greater than 18.75 inches; and said racket excluding said system having a frequency $f_1$ greater than 115 cycles per second.

5. A tennis racket as in claim 4, and said racket including said system having a weight less than 10.7 ounces.

6. A tennis racket as in claim 4; and said weight W is greater than 10.7 ounces.

7. A tennis racket as in claim 4 wherein said weight means comprises a strip of material, said strip not being a liquid.

8. A tennis racket as in claim 7 wherein said strip of material comprises an enclosure containing material capable of absorbing energy.

9. A tennis racket as in claim 4, wherein the said movement between said weight means and the said handle portion does not vibrate between two extreme positions from said handle portion a plurality of cycles.

10. A complete tennis racket held by the hand of a player for impacting a ball comprising at least a frame having a head portion and a throat portion supporting a string netting in a plane, and a handle portion having a grip portion suitably adapted for the hand to grip, the end of the grip portion being located at the handle portion end of the racket; said racket having a longitudinal axis running from the center of the head portion end of the racket to the center of the grip portion end of the racket; said netting having a length along the longitudinal axis of said frame greater than 9 inches and a width along an axis perpendicular to said axis greater than 7.5 inches; a center of percussion located at a distance Cp in inches from the end of the grip portion when tested in accordance with test 4 of FIG. 15 herein before defined, said center of percussion taken about a pivot located at the end of the grip portion said pivot having an axis perpendicular to the longitudinal axis of said racket and parallel to the plane of said netting; said racket having a center of gravity located at a distance Cg in inches from the end of the grip portion; said racket having a weight distribution providing a moment of inertia Ia in ounce inches squared about said longitudinal axis; said racket having a weight W in ounces; said racket chracterized in that the product of said distance Cg and said weight W given by the formula WCg is less than 160 ounce-inches; and said distance Cp is greater than 18.75 inches; and said weight is greater than 10.7 ounces; and the magnitude of Ia is greater than 80 ounce-inches squared.

11. A tennis racket as in claim 10 wherein said netting has a length along said longitudinal axis greater than 12 inches.

12. A tennis racket as in claim 11 wherein said head portion is substantially only one material being a formed aluminum tube having a crossectional shape, said shape having a wall thickness less than 0.044 inches and a perimeter of the outer surface being greater than 2.125 inches; said tube having a single cavity along its length.

13. A tennis racket as in claim 10 and said head portion comprising a crown portion and two adjacent side portions, said side portions extending from the end of said handle portion to joint the said crown portion; said crown portion comprising a metal tube having a thin wall, said side portions being a thin wall tube comprising substantially only one material and said material being a composite material of fibers and resin.

14. A tennis racket as in claim 10 wherein said netting has vertical strings and horizontal strings entering string holes located in said frame; means for spacing at least two of said vertical strings at locations in the vicinity of said throat portion of the racket to provide that at least two of said string holes are displaced to the side away from said longitudinal axis; said means comprising a member capable of retaining said vertical strings in spaced paths as said strings pass through said member, said member in conjunction with said string holes located in said frame deflecting each of said vertical strings to the side forming at least two portions said portions forming an angle of at least 15 degrees; said member being supported by said strings; said member being capable of moving together with said strings freely with respect to said frame.

15. A tennis racket as in claim 14 wherein said member has a weight less than 1 ounce.

16. A racket as in claim 10 wherein said moment of inertia Ia is greater than 95 oz-inches squared.

17. A racket as in claim 10 wherein said racket has an overall length along said longitudinal axis less than 27.75 inches.

18. A tennis racket having a frame having a head portion, a throat portion, and a handle portion, said head portion and said throat portion of said frame supporting a string netting in a plane, said netting having vertical strings and horizontal strings, said strings entering string holes located in said frame; said racket having a longitudinal axis running from the center of the head portion end of the racket to the center of the handle portion end of the racket; means for providing that the vertical strings in the vicinity of said longitudinal axis terminate at string holes in the throat portion of the racket being located at a greater distance from the junction of said throat portion and the said handle portion than the distance that occurs when the said vertical strings in the vicinity of said longitudinal axis proceed between said string holes in a single straight line, said line being parallel to said longitudinal axis; means comprising a first member for spacing at least two of said vertical strings at locations in the vicinity of said throat portion of the racket; said first member capable of retaining said vertical strings in spaced paths as said strings pass through said first member; said first member in conjunction with said string holes located in said frame deflecting each of said vertical strings to the side thereby forming at least two portions forming an angle of at least 15 degrees; said first member being supported by said strings; said first member being capable of moving together with said strings freely with respect to said frame.

19. A tennis racket as in claim 18, wherein said member has a weight less than 1 ounce.

20. A complete tennis racket having at least a head portion and a handle portion, said handle having a grip portion suitably adapted for the hand to grip, the end of the grip portion being located at the handle portion end of the racket; said head portion supporting a string netting in a plane, said netting having vertical and horizontal strings; said racket characterized in that the longest vertical string has a length greater than 12 inches and the longest horizontal string has a length greater than 9.5 inches; and said racket having a weight W in ounces, and the said W being less than 10.7 ounces; said racket having a weight distribution providing for the center of percussion located at a distance Cp in inches from the end of the grip portion when tested in accordance with test 4 of FIG. 15 herein before defined, said center of percussion taken about a pivot located at the end of the grip portion, a longitudinal axis running from the center of the grip portion end of the racket to the center of the head portion end of the racket, said pivot having an axis perpendicular to said longitudinal axis, and being parallel to the plane of said string netting; said distance Cp being greater than 18.75 inches; and said racket having a weight distribution providing for the center of gravity of said racket being located at a distance CG in inches from said end of the grip portion; said racket having a weight distribution providing for the moment of inertia Ia in ounce-inches squared about said longitudinal axis; said racket further characterized in that the product of said distance Cg and said weight W given by the formula WCg is less than 160 ounce-inches; and the magnitude of Ia is greater than 80 ounce-inches squared and the said magnitude of Ia being attained without a weight means being attached to the said head portion of the racket.

21. A racket as in claim 20 wherein said racket having an overall length L along said longitudinal axis; and said distance Cp divided by said distance L given by the formula Cp/L being greater than 0.70.

22. A racket as in claim 20 wherein said head portion comprises a frame being a hollow tube having a length, said tube having a single cavity along its length, said tube having a crossectional shape, said shape having a wall thickness less than 0.044 inches and the perimeter of the outside surface being greater than 2.125 inches, said tube being devoid of a seam having overlapping surfaces said seam being in the direction of the length of said tube.

23. A racket as in claim 22 wherein said head portion is shaped to support said string netting, said netting exerting mechanical forces on said head portion, said head portion having a crown portion and two adjacent side portions converging toward and joining said handle portion, said side portions forming a throat portion adjacent to said handle portion, said throat portion being devoid of a throat member said member being located between said side portions and said member providing structural support resisting significantly said mechanical forces exerted by said netting on said head portion.

24. A racket held by the hand of a player to impact a ball comprising at least a frame having a head portion supporting a netting in a plane; said handle portion having a hollow tube said tube having a side wall, said handle portion having a grip portion suitably adapted for the hand to grip, the end of the grip portion being located at the handle portion end of the racket; said racket having a longitudinal axis running from the center of the head portion end of the racket to the center of the handle portion end of the racket; and said racket having a system comprising a weight means and a means for the attachment of said weight means to the handle portion of said racket providing for the reduction of the shock and vibration received by the player's hand during the said impact of the racket with the ball and the vibration subsequent to the said impact; said weight means comprising a strip of material suitable to absorb shock and vibration energy from said racket handle portion, said energy being induced in said handle portion when the racket impacts the ball; said strip of material not being a liquid; said weight means having a center of gravity being located at all times between the end of the grip portion and points located on the handle portion at a distance F from the end of the grip portion, said distance F being less than 0.26 of the overall length of said racket along said longitudinal axis; said weight means being loosely attached to said handle portion, substantial space being provided between said weight means and the said side wall of said handle portion, said space allowing said weight means to attain significant velocity with respect to the handle portion in a direction perpendicular to said longitudinal axis upon impact of said racket with said ball, the plane of said string netting being substantially parallel to the direction of the force of gravity upon said impact of the racket with said ball; said racket exclusive of said system having a weight and stiffness distribution providing a frequency of vibration $f_1$ in cycles per second when tested in accordance with test 13 of FIG. 15 herein before defined; said weight means and said means for the attachment of said weight means being configured and structured to provide that responsive to a single impulsive force to said weight means, the movement between said weight means and said handle portion is not vibratory at a frequency $f_2$, and said frequency $f_2$ being greater than 0.45 of said frequency $f_1$ and being less than 1.55 of said frequency $f_1$.

25. A racket as in claim 24 wherein said strip of material is an enclosure containing a material suitable to absorb energy.

26. A racket as in claim 24 wherein said strip of material is capable of impacting the racket handle when the racket impacts the ball; and said strip having a length along the longitudinal axis of aid racket, less than 7.0 inches.

27. A racket as in claim 24, wherein said distance F is less than 0.175 of the overall length of said racket along said longitudinal axis.

28. A tennis racket as in claim 24 wherein the said movement between said weight means and the said handle portion does to vibrate between two extreme positions from said handle portion a plurality of cycles.

29. A complete tennis racket held by the hand of a player to impact a ball comprising at least a frame having a head portion and a handle portion, said head portion supporting a string netting in a plane and said handle portion having a grip portion suitably adapted for the hand to grip, the end of the grip portion being located at the handle portion end of the racket, said racket having a longitudinal axis running from the center of the head portion end of the racket to the center of the grip portion end of the racket, said netting having a length along the longitudinal axis of said frame greater than 9 inches and a width along an axis perpendicular to said longitudinal axis greater than 7.5 inches; said racket having a center of percussion located at a distance Cp in inches from the end of the grip portion when tested in accordance with test 4 of FIG. 15 herein before defined said center of percussion taken about a pivot located at the end of the grip portion, said pivot having an axis perpendicular to the longitudinal axis of said racket and parallel to the plane of said string netting; said racket characterized in that said racket has a system comprising a weight means and a means for the attachment of said weight means to the handle portion of the racket for the reduction of the shock and vibration received by the player's hand during the said impact of the racket with the ball and the vibration subsequent to the said impact; said racket exclusive of said system having a weight less than 10.7 ounces; said racket exclusive of said system having said distance Cp greater than 18.75 inches; said racket exclusive of said system having a weight and stiffness distribution providing a frequency of vibration $f_1$ in cycles per second when tested in accordance with test 13 of FIG. 15 herein before defined; said weight means comprising at least one member, said weight means being located in the handle portion of the racket said weight means having a weight greater than 0.75 ounces, said weight means having a center of gravity being located at all times in the portion of the racket located between the end of the grip portion and set of points located on the handle portion at a distance F from the end of the grip portion; said distance F being less than 0.175 of the overall length of the racket along said longitudinal axis; said weight means and said means for the attachment of said weight means being configured and structured to provide that responsive to a single impulsive force to said weight means, the movement between said weight means and said handle portion is not vibratory at a frequency $f_2$, and said frequency $f_2$ being greater than 0.45 of said frequency $f_1$ and being less than 1.55 of said frequency $f_1$.

30. A racket as in claim 29 wherein said weight means has a weight greater than 1.0 ounce.

31. A racket as in claim 29 wherein said weight means is loosely attached to said handle portion; substantial space being provided between said weight means and the said handle portion, said space allowing said weight means to attain significant velocity with respect to said handle portion in the direction perpendicular to said longitudinal axis of the racket upon impact of said racket with said ball, the plane of said string netting being substantially parallel to the direction of the force of gravity upon impact of said racket with said ball.

32. A complete tennis racket held by the hand of a player to impact a ball comprising at least a frame having a head portion supporting a string netting in a plane and a handle portion being a hollow tube, said tube having a side wall, said handle portion having a grip portion suitably adapted for the hand to grip, the end of the grip portion being located at the handle portion end of the racket, said racket having a longitudinal axis running from the center of the head portion end of the racket to the center of the grip portion end of the racket; said netting having a length along the longitudinal axis of said racket greater than 9 inches and a width along an axis perpendicular to said axis greater than 7.5 inches; said racket having a weight distribution providing a center of percussion located at a distance Cp in inches from the end of the grip portion when tested in accordance with test 4 of FIG. 15 herein before defined, said center of percussion taken about a pivot located at the end of the grip portion, said pivot having an axis perpendicular to the longitudinal axis of said racket and parallel to the plane of said string netting; said racket characterized in that said handle portion has a system comprising a weight means and a means for the attachment of said weight means to the handle portion of the racket for the reduction of the shock and vibration received by the player's hand during the impact of the racket with the ball and the vibration subsequent to said impact; said weight means being loosely attached to said handle portion; substantial space being provided between said weight means and said side wall of said handle portion, said space allowing said weight means to attain significant velocity with respect to said handle portion in the direction perpendicular to said longitudinal axis upon impact of said racket with the said ball, the plane of said netting being substantially parallel to the direction of the force of gravity upon impact of said racket with said ball; said weight means being capable of absorbing energy from the racket handle portion, said energy being induced in said handle portion when the racket impacts the ball; said racket exclusive of said system having a weight and stiffness distribution providing for a frequency of vibration $f_1$ in cycles per second when tested in accordance with test 13 of FIG. 15 herein before defined; said weight means and said means for the attachment of said weight means being configured and structured to provide that responsive to a single impulsive force to said weight means the movement between said weight means and said handle portion is not vibratory at a frequency $f_2$, and said frequency $f_2$ being greater than 0.45 of said frequency $f_1$ and being less than 1.55 of said frequency $f_1$; said weight means having a center of gravity being located at all times between the end of the grip portion and points on the handle portion located at a distance F from the end of the grip portion, said distance F being less than 0.26 of the overall length of said racket along said longitudinal axis; said racket excluding said system having a weight less than 10.7 ounces; said racket excluding said system having said distance Cp greater than 18.75 inches; and said racket including said system having a weight greater than 10.7 ounces.

33. A racket as in claim 32, wherein said weight means, and said means for the attachment of said weight means to the handle portion of the racket, are configured and structured to provide that responsive to a single impulsive force to said weight means, the movement between said weight means and said handle portion does not vibrate between two extreme positions from said handle portion a plurality of cycles.

34. A complete tennis racket held by the hand of a player to impact a ball comprising at least a frame having a head portion supporting a string netting in a plane and a handle portion, said handle portion having a grip portion suitably adapted for the hand to grip, the end of the grip portion being located at the handle portion end of said racket, said racket having a longitudinal axis running from the center of the head portion end of the racket to the center of the grip portion end of the racket, said netting having a length along the longitudinal axis of said racket greater than 9 inches and width along an axis perpendicular to said axis greater than 7.5 inches; said racket having a weight distribution providing a center of percussion located at a distance Cp in inches from the end of the grip portion when tested in accordance with test 4 of FIG. 15 herein before defined said center of percussion taken about a pivot located at the end of the grip portion, said pivot having an axis perpendicular to the longitudinal axis of said racket and parallel to the plane of said string netting; said racket characterized in that the handle portion has a system comprising a weight means and a means for the attachment of said weight means to the handle portion of the racket for reducing the shock and vibration received by the player's hand during said impact of the racket with the ball and the vibration subsequent to said impact; said weight means being firmly attached to said handle portion to provide that responsive to a single impulsive force to said weight means, there is no significant movement between said weight means and said handle portion; said weight means having a center of gravity being located at all times between the end of the grip portion and points located on the handle portion at a distance E from the end of the grip portion, said distance F being less than 0.26 of the overall length of said racket along said longitudinal axis; said racket excluding said system having a weight less than 10.7 ounces; and said racket excluding said system having a magnitude of Cp greater than 18.75 inches; and said weight means having a weight greater than 0.75 ounces; said racket having a weight distribution providing for a moment of inertia Ia in ounce inches squared about said longitudinal axis and the magnitude of Ia is greater than 75 ounce inches squared, and the magnitude of Ia being attained without a weight means being attached to the said head portion of the racket.

35. A complete tennis racket held by the hand of a player to impact a ball comprising at least a frame having a head portion supporting a string netting in a plane and a handle portion being a hollow tube having a side wall, said handle portion having a grip portion being located at the handle portion end of the racket; said racket having a longitudinal axis running from the center of the head portion end of the racket to the center of the grip portion end of the racket; said racket having a weight and stiffness distribution providing for the nodal pivot closest to the grip portion end of the racket being located at a distance N in inches from the end of the grip portion when tested in accordance with test 15 of FIG. 15 herein before defined; said racket having a weight distribution providing for the center of percussion to be located at distance Cp in inches from the end of the grip portion when tested in accordance with test 4 of FIG. 15 herein before defined, said center of percussion aken about a pivot located at the end of the grip portion, said pivot having an axis perpendicular to the longitudinal axis of said racket and parallel to the plane of said string netting; said racket characterized in that the handle portion has a system comprising a weight means and a means for the attachment of said weight means to the handle portion of the racket for reducing the shock and vibration received by the player's hand during the said impact of the racket with the ball and the vibrations subsequent to said impact; said weight means having a center of gravity being located at all times between the end of the grip portion and points on the handle portion located at a distance F from the end of the grip portion, said distance F being less than 0.26 of the overall length of said racket along said longitudinal axis; said racket exclusive of said system having a weight and stiffness distribution providing for a frequency of vibration $f_1$ when tested in accordance with test 13 of FIG. 15 herein before defined; said weight means being loosely attached to said handle portion; substantial space being provided between said weight means and said sidewall of said handle portion; said space allowing said weight means to attain significant velocity with respect to said handle portion in the direction perpendicular to said longitudinal axis upon impact of said racket with said ball, the plane of said netting being substantially parallel to the direction of the force of gravity upon impact of said racket with said ball; said weight means being capable of absorbing energy from the handle portion; said energy being induced in said handle portion when said racket impacts the ball; said weight means and said means for the attachment of said weight means to the handle portion of the racket being configured and structured to provide that responsive to a single impulsive force to said weight means the movement between said weight means and said handle portion is not vibratory at a frequency $f_2$, and said frequency $f_2$ being greater than 0.45 of said frequency $f_1$ and being less than 1.55 of said frequency $f_1$, and said racket excluding said system having said nodal distance N being greater than 6.75 inches; and said racket excluding said system having said distance Cp being greater than 18.75 inches.

36. A tennis racket as in claim 35 wherein the said movement between said weight means and said handle portion does not vibrate between two extreme positions from said handle portion a plurality of cycles.

37. A complete tennis racket held by the hand of a player to impact a ball comprising at least a frame having a head portion supporting a string netting in a plane and a handle portion, said handle portion having a grip portion being located at the handle portion end of the racket; said racket having a longitudinal axis running from the center of the head portion end of the racket to the center of the grip portion of the racket; said racket having a weight and stiffness distribution providing for the nodal pivot closest to the grip portion end being located at a distance N in inches from the said end of the grip portion when tested in accordance with test 15 herein before described; said racket characterized in that the handle portion has a system comprising a weight means and a means for the attachment of said weight means to the handle portion of the racket, for reducing the shock and vibration received by the player's hand during said impact of the racket with the ball and the vibration subsequent to said impact; said weight means having a center of gravity being located at all times between the end of the grip portion and points on the handle portion located at a distance F from the end of the grip portion, said distance F being less than 0.26 of the overall length of said racket along said longitudinal axis; said weight means being firmly attached to said handle portion to provide that responsive to a single impulsive force to said weight means there is no significant movement between said weight means and said handle portion; said racket exclusive of said system having a weight distribution providing a center of percussion being located at a distance Cp from the end of the grip portion when tested in accordance with test 4 of FIG. 15 herein before defined said center of percussion taken about a pivot located at the end of the grip portion, said pivot having an axis perpendicular to the longitudinal axis of said racket and parallel to the plane of said string netting and the magnitude of said distance Cp being greater than 18.75 inches; and said racket excluding said system having a distance N greater than 6.75 inches; said racket having a weight distribution providing for a moment of inertia Ia in ounce-inches squared about said longitudinal axis and the magnitude of Ia is greater than 75 ounce-inches squared, and the magnitude of Ia being attained without a weight means being attached to the said head portion of the racket.

38. A tennis racket used by a player to impact a ball comprising at least a frame having rigidity and strength with a minimum of weight in the middle portion of said racket, said frame comprising at least a head portion and a handle portion; said handle portion having a grip portion suitably adapted for the hand to grip, the end of the grip portion being located at the handle portion end of racket, said racket having a longitudinal axis running from the center of the head portion end of the racket to the center of the handle portion end of the racket; said head portion being an elongated strip of at least two materials having a crown portion and two adjacent side portions suitably shaped to support a netting of strings, said strings being stretched and exerting tensile forces on said head portion, said netting lying in a plane, each of said side portions extending from said handle portion to join said crown portion at a first junction; each of said side portions comprising substantially only a first material, said side portion resisting mechanical forces, said forces resulting from said tensile forces exerted by said strings on said head portion, said first material resisting substantially all of said mechanical forces resisted by said side portions; said first material being a composite of fiber reinforced plastic having great strength great stiffness, and light weight; said crown portion resisting mechanical forces, said forces resulting from said tensile forces exerted by the strings on said head portion, said crown portion comprising a second material, said second material being a major portion of said crown portion, said second material resisting a major portion of all said mechanical forces resisted by the crown portion; said second material not being a composite of fiber reinforced plastic, said second material having adequate strength and stiffness.

39. A tennis racket as in claim 38 wherein said handle portion resists mechanical forces, said forces resulting from the said impact of the racket with the ball, said handle portion comprising substantially only one material said material resisting substantially all of the said forces resisted by said handle portion said material is a composite material of fibers and resin said material having light weight and great strength and great stiffness.

40. A tennis racket as in claim 38 wherein said handle portion is a thin wall tube having a single cavity said handle portion resisting mechanical forces said forces resulting from said impact of the racket with the ball, said handle portion comprising substantially only one material, said material resisting substantially all of the said forces resisted by the handle portion said material being metal; said tube having a crossectional diameter being greater than 1 inch and said side wall being less than 0.030 inches, thereby providing that said handle portion having adequate stiffness and strength being light in weight relative to the head portion of said racket, and having a diameter of said handle portion being substantially greater than a crossectional diameter of the frame in the head portion of the racket.

41. A tennis racket as in claim 38 wherein said second material in the crown portion is a metal strip.

42. A tennis racket as in claim 38 wherein said second material in the crown portion of said head portion is a wood strip.

43. A tennis racket as in claim 38 wherein said side portions are thin wall tubes.

44. A tennis racket as in claim 38 wherein said side portions are hollow thin wall tubes.

45. A tennis racket as in claim 38 wherein said head portion comprises a crown portion being a member and each of said side portions being a member, said crown portion member and said side portion members not being integrally formed to comprise said head portion, and one end of said crown portion member being fastened to a first end of each of said side portion members at first junction; the said handle portion of said racket being fastened to the second end of each of said side portion members.

46. A tennis racket as in claim 38, wherein said netting has a length S along said longitudinal axis; and said first junction being located at a distance J from a transverse axis toward the head portion end of the racket, said transverse axis being perpendicular to said longitudinal axis, said transverse axis being located at the end of said netting along said longitudinal axis closest to said handle portion of the racket; said distance J being greater than 0.15 of said distance S.

*47. A complete tennis racket having at least a head portion and a handle portion, said handle portion having a grip portion suitably adapted for the hand to grip, the end of the grip portion being located at the handle portion end of the racket; said head portion supporting a string netting in a plane; said netting having vertical and horizontal strings; said racket having a longitudinal axis running from the center of the grip portion end of the racket to the center of the head portion end of the racket; said racket having a weight distribution providing for the moment of inertia Ia in ounce inches squared about said longitudinal axis; said racket having a weight and stiffness distribution providing a frequency of vibration $f_1$ in cycles per second when tested in accordance with test 13 of FIG. 15 herein before defined; said racket having a length L in inches from the end of the grip portion to the end of the head portion; said racket characterized in that the magnitude of Ia is greater than 80 ounce inches squared; and the magnitude of $f_1$ is greater than 160 cycles per second and said length L is greater than 25.5 inches.*

*48. A racket as in claim 47 wherein said netting has a width along a transverse axis perpendicular to said longitudinal axis greater than 9.5 inches.*

*49. A racket as in claim 47 wherein said netting has a length along said longitudinal axis greater than 12 inches.*

*50. A complete racket having at least a head portion and a handle portion, said handle portion having a grip portion suitably adapted for the hand to grip, the end of the grip portion being located at the handle portion end of the racket; said head portion supporting a string netting in a plane; said netting having vertical and horizontal strings; said racket having a longitudinal axis running from the center of the grip portion end of the racket to the center of the head portion end of the racket, said racket having a weight distribution providing for the moment of inertia Ia in ounce inches squared about said longitudinal axis; said racket having a weight and stiffness distribution providing a frequency of vibration $f_1$ in cycles per second when tested in accordance with test 13 of FIG. 15 herein before defined; said racket having a length L in inches from the end of the grip portion to the end of the head portion; said weight distribution providing for a center of percussion being located at a distance Cp in inches from the end of the grip portion when tested in accordance with test 4 of FIG. 15 herein before defined, said center of percussion taken about a pivot located at the end of the grip portion, said pivot having an axis perpendicular to the said longitudinal axis of the racket and parallel to the plane of said string netting; said racket having a center of gravity located at a distance Cg in inches from the end of said grip portion; said racket having a weight W in ounces; said racket characterized in that the magnitude of Ia is greater than 80 ounce inches squared; the magnitude of $f_1$ is greater than 160 cycles per second; the product of said weight W and said distance Cg given by the formula WCg is less than 160 ounce inches and said distance Cp is greater than 18.75 inches.*

*51. A racket as in claim 50 wherein said weight W is less than 10.7 ounces.*

*52. A racket as in claim 50 wherein the width of said netting is greater than 9.5 inches.*

*53. A racket as in claim 50 wherein the length of said netting is greater than 12 inches.*

*54. A racket as in claim 10 wherein said racket has a weight means located in the handle portion of the racket; and said racket excluding said weight means having a weight and stiffness distribution providing for a frequency of vibration $f_1$ in cycles per second when tested in accordance with test 13 of FIG. 15 hereinbefore defined, and said frequency $f_1$ being greater than 160 cycles per second.*

*55. A racket as in claim 54 wherein said racket excluding said weight means has a weight being less than 10.7 ounces.*

*56. A complete racket having at least a head portion and a handle portion, said handle portion having a grip portion suitably adapted for the hand to grip, the end of the grip portion being located at the handle portion end of the racket, said head portion supporting a string netting in a plane, said netting having vertical and horizontal strings; said racket having a weight W in ounces; and said racket having a weight distribution providing for the center of percussion being located at a distance Cp in inches from*

*the end of the grip portion when tested in accordance with test 4 of FIG. 15 herein before defined, said center of percussion taken about a pivot located at the end of the grip portion; a longitudinal axis running from the center of the grip portion end of the racket to the center of the head portion end of the racket, said pivot having an axis perpendicular to said longitudinal axis and being parallel to the plane of said string netting; said racket having a weight distribution providing for the center of gravity being located at a distance Cg in inches from said end of the grip portion; said racket having a weight distribution providing for the moment of inertia Ia in ounce inches squared about said longitudinal axis; said racket having a moment of inertia $I_s$ in ounce inches squared taken about said pivot located at the end of the grip portion, and $I_s$ is directly proportional to the product of Cp, Cg, W given by the formula $I_s=(Cp)(Cg)(W)$; said racket having an overall length L along said longitudinal axis; said racket characterized in that the distance Cp divided by the distance L given by Cp/L is greater than 0.70; and said moment of inertia Ia divided by said moment of inertia $I_s$ given by Ia/Is is greater than 0.033.*

*57. A racket as in claim 56 wherein said racket has a weight and stiffness distribution which provides for a frequency of vibration $f_1$ in cycles per second when tested in accordance with test 13 of FIG. 15 herein before defined and said frequency $f_1$ is greater than 165 cycles per second.*

* * * * *